United States Patent
Kobayashi

(10) Patent No.: US 6,579,389 B1
(45) Date of Patent: Jun. 17, 2003

(54) PNEUMATIC TIRE AND METHOD OF IMPROVING HIGH-SPEED RFV THEREOF

(75) Inventor: Hiroyuki Kobayashi, Kobe (JP)

(73) Assignee: Sumitomo Rubber Industries, Ltd., Hyogo-Ken (JP)

( * ) Notice: Subject to any disclaimer, the term of this patent is extended or adjusted under 35 U.S.C. 154(b) by 76 days.

(21) Appl. No.: 09/628,643

(22) Filed: Jul. 28, 2000

(30) Foreign Application Priority Data

Jul. 28, 1999 (JP) ............................................ 11-213937
Jun. 19, 2000 (JP) ....................................... 2000-183292

(51) Int. Cl.$^7$ ............................ B60C 19/00; F16F 15/32
(52) U.S. Cl. ...................... 156/64; 152/154.1; 156/75; 156/123
(58) Field of Search ................ 156/75, 123, 110.1, 156/64; 152/154.1, 367; 73/146, 66, 460

(56) References Cited

U.S. PATENT DOCUMENTS

| | | | |
|---|---|---|---|
| 2,080,227 A | * 5/1937 | Periat et al. ............. | 152/154.1 |
| 2,245,355 A | 6/1941 | Mullen | |
| 3,725,163 A | * 4/1973 | Hofelt, Jr. .................... | 156/75 |
| 5,915,274 A | * 6/1999 | Douglas ...................... | 73/462 |

FOREIGN PATENT DOCUMENTS

| | | | |
|---|---|---|---|
| JP | 63-142228 A | * | 6/1988 |
| JP | 7-156293 A | * | 6/1995 |

OTHER PUBLICATIONS

Patent Abstracts of Japan, vol. 1995, No. 09, Oct. 31, 1995, Sumitomor Rubber Industries, Ltd. (Abstract Only).
Patent Abstracts of Japan, vol. 012, No. 401 (P–776), Oct. 25, 1988, Bridgestone Corporation (Abstract Only).
Patent Abstracts of Japan, vol. 1999, No. 14, Dec. 22, 1999, Bridgestone Corporation (Abstract Only).

\* cited by examiner

*Primary Examiner*—Geoffrey L. Knable
(74) *Attorney, Agent, or Firm*—Birch, Stewart, Kolasch & Birch, LLP

(57) ABSTRACT

A method of improving high-speed radial force variation of a pneumatic tire is disclosed. The tread portion is provided on the radially inner surface with an elastic patch. The weight and position of the patch determined based on (A) a low-speed fundamental RFV or (B) a low-speed fundamental RRO or (C) a weight imbalance of the tire. In case (A), the position is a point of the minimum low-speed fundamental RFV and the weight is $\{(F \times TR)/33^2\} \times 1000 \times a1$. In case (B), the position is a point of the minimum low-speed fundamental RRO and the weight is $\{(RO \times TR)/33^2\} \times 1000 \times a2$. In case (C), the position is a light weight position and the weight $UB \times (RR/TR) \times a3$. Here, TR is the radius in meter of the tire, F is the maximum variation of the low-speed fundamental RFV, RO is the maximum variation of the low-speed fundamental RRO, RR is the radius of the wheel rim, UB is the tire imbalance, a1 is coefficient in a range of from 0.5 to 3.0, a2 is a coefficient in a range of from 100 to 400, a3 is a coefficient in a range of from 0.5 to 2.0.

10 Claims, 4 Drawing Sheets

PNEUMATIC TIRE AND METHOD OF IMPROVING HIGH-SPEED RFV THEREOF

BACKGROUND OF THE INVENTION

1. Field of the Invention

The present invention relates to a method of improving the high-speed radial force variation of a pneumatic tire and a pneumatic tire having improved high-speed radial force variation.

2. Description of the Related Art

The radial force variation (RFV), radial runout (RRO) weight imbalance of a pneumatic tire are well known factors in tire vibrations during running, and they are mutually related to a high degree. Generally, various standards relating to tire uniformity tests such as the Japanese standard JASO C607-87 refer to the RFV and RRO measured at a relatively slow speed at which the centrifugal force can be disregarded (hereinafter low-speed RFV and low-speed RRO).

Even if such low-speed RFV and low-speed RRO and the weight imbalance at a relatively slow rotational speed are improved, there is still a possibility that vibrations occur during high-speed running over 80 km/h.

SUMMARY OF THE INVENTION

Thus, the inventor studied and found that a chief factor in the tire vibrations is the fundamental wave or harmonic of the RFV during high-speed running (hereinafter high-speed fundamental RFV).

Therefore, a primary object of the present invention is to improve the high-speed RFV of a pneumatic tire without affecting the low-speed RFV and RRO.

According to one aspect of the present invention, a tread portion of a pneumatic tire is provided on the radially inner surface with an elastic patch, the patch having a certain weight and being stuck at a certain circumferential position, the weight and position are determined based on (A) low-speed fundamental RFV or (B) low-speed fundamental RRO or (C) static weight imbalance of the tire, each measured before applying the patch.

BRIEF DESCRIPTION OF THE DRAWINGS

An embodiment of the present invention will now be described in detail in conjunction with the accompanying drawings.

DETAILED DESCRIPTION

According to the present invention, a pneumatic tire 1 is provided with a patch 10. The patch 10 is stuck on the radially inner surface HS of the tread portion 2, and as explained hereunder, its position P and weight M are determined based on (A) low-speed fundamental RFV or (B) low-speed fundamental RRO or (C) weight imbalance of the tire, each measured before applying the patch.

The pneumatic tire 1, as the subject of the present invention, includes various tires such as the usual vulcanized rubber tire which has a hollow to be filled with air, and has easy access the radially inner surface HS of the tread portion 2.

Figure 1:
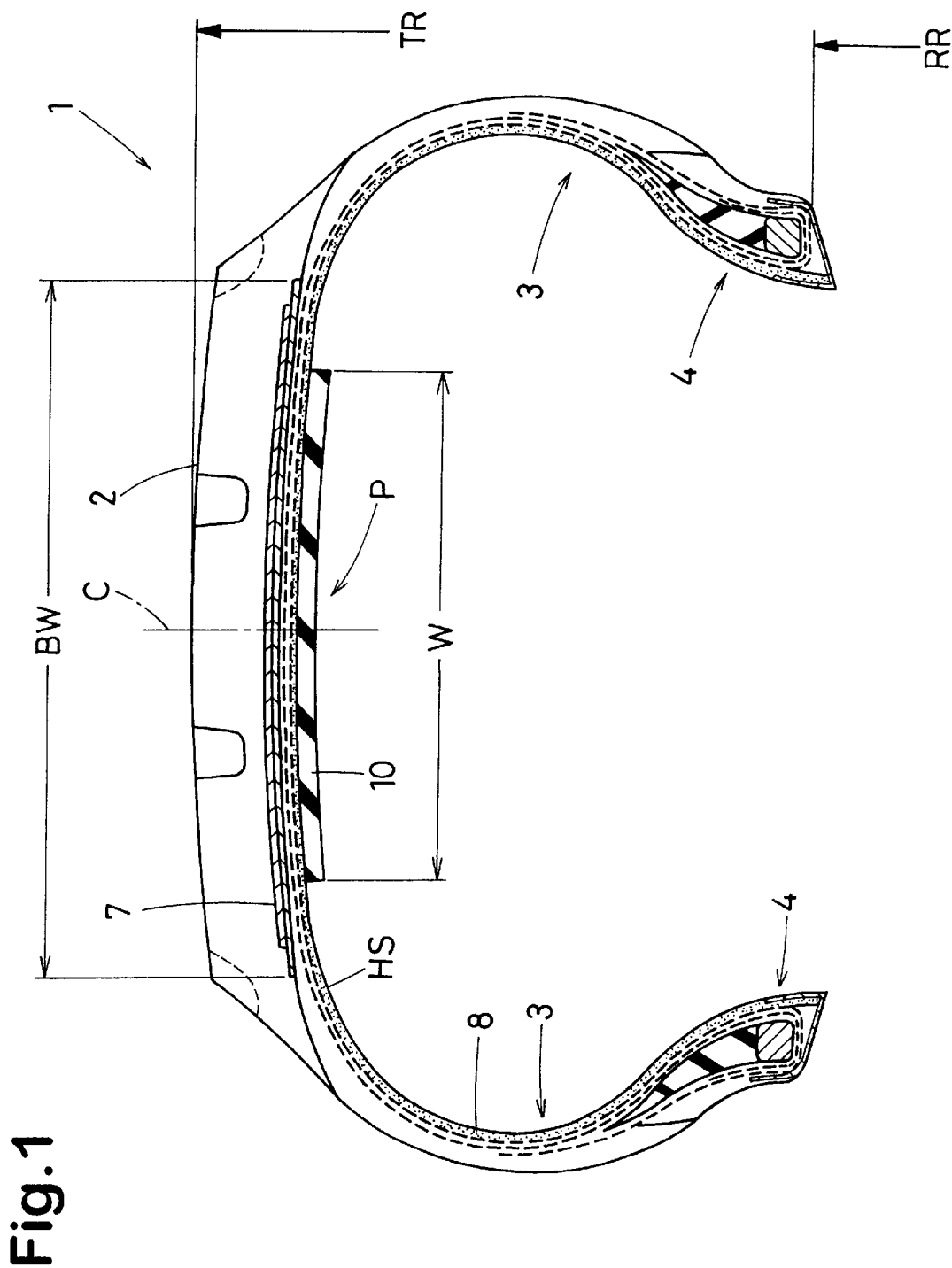
FIG. 1 is a cross sectional view of a pneumatic tire according to the present invention.

FIG. 1 shows such a vulcanized rubber tire which is composed of the above-mentioned tread portion 2, a pair of axially spaced bead portions 4 and a pair of sidewall portions 3 extending therebetween. This particular example is a tubeless radial tire for passenger cars of which the inner surface HS is covered with an inner liner 8 made of air-impermeable rubber.

The patch 10 is a sheet of an elastic material made of, e.g., vulcanized rubbers, synthetic resins and the like. The JIS hardness measured with a type-A durometer is preferably less than 60 degrees.

Figure 2:
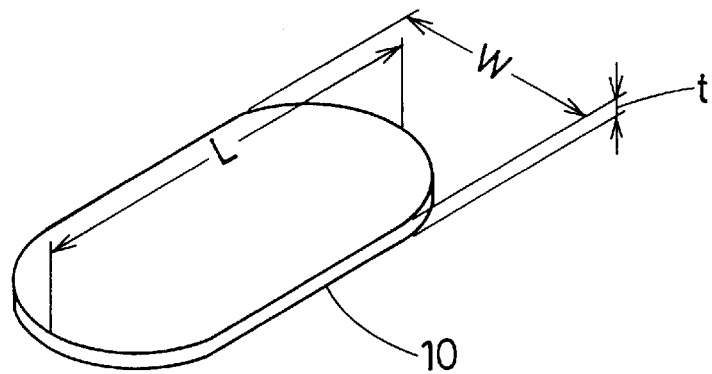
FIG. 2 is a perspective view showing an example of the patch.
Figure 3:
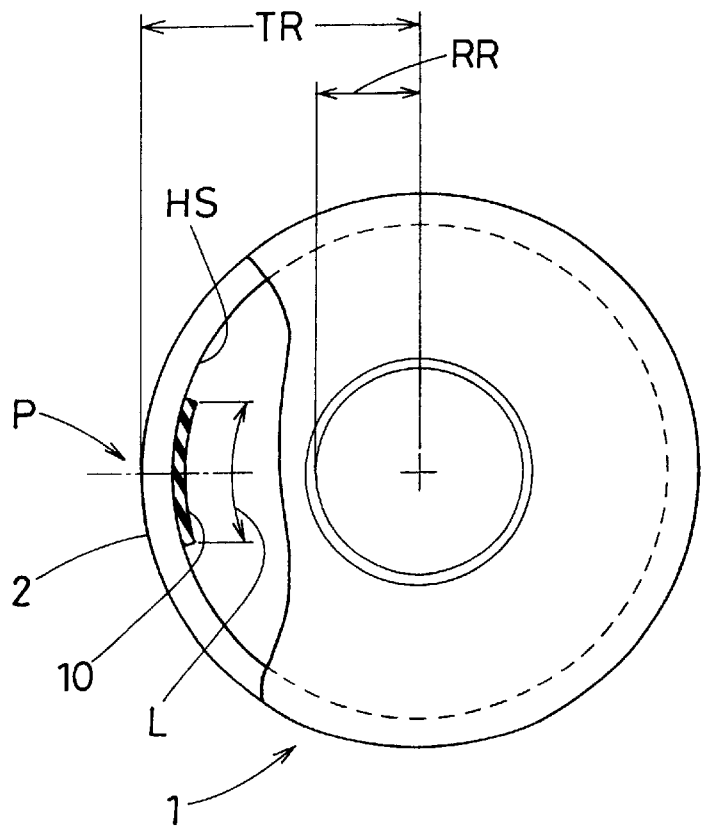
FIG. 3 is a schematic cross sectional view of the tire taken along the tire equator.

The patch 10 may be formed in various shapes, e.g., circle, ellipse, rectangle, square and the like. In this embodiment, the shape is an ellipse or a rectangle whose corners are rounded, as shown in FIG. 2.

If the circumferential position P is determined, the patch 10 is fixed by means of adhesive agent so as to center on the position P with respect to the circumferential direction and center on the tire equator C with respect to the axial direction.

In case of the patch made of rubber, a rubber cement of self-vulcanization type can be preferably used for the adhesive agent. But, various adhesive agents can be used.

The thickness t, length L and width W of the patch 10 depend on its weight M. But, it is preferable for controlling a decrease in the tire uniformity that: the thickness t is less than 2.0 mm but not less than 1.0 mm; the circumferential length L is less than 300 mm but not less than 50 mm; and the axial width W is less than the width BW of a tread reinforcing belt 7 but not less than 25 mm.

(A) Determination of position and weight based on Low-speed fundamental RFV

The radial force variation (RFV) of the tire is measured at a relatively slow rotational speed of 60 rpm. This speed corresponds to a circumferential velocity of about 7 km/h in the case of passenger car tires. The circumferential velocity may be increased up to about 15 km/h as far as the centrifugal force does not affect the measurement.

For the method of measuring the RFV, "Testing method for automobile tire uniformity", Japanese Automobile Standards Organization, C607-87, can be adopted.

Figure 4:
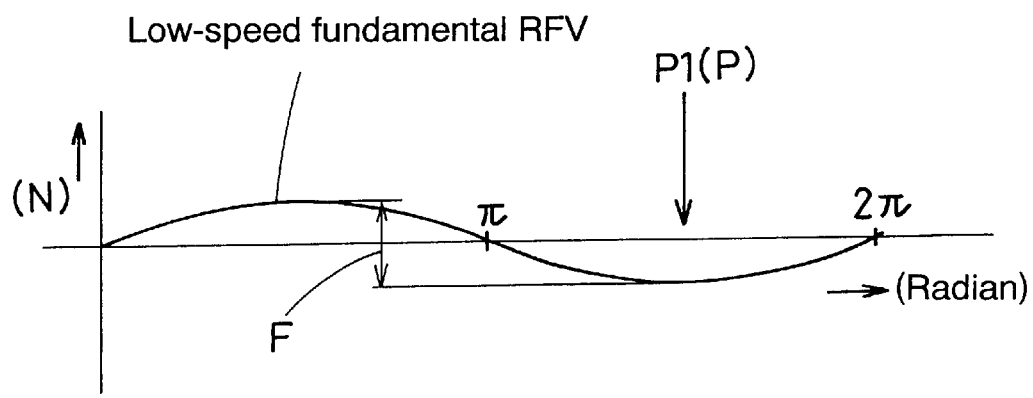
FIG. 4 is a graph showing a low-speed fundamental RFV.

FIG. 4 shows an example of the radial force variation per one revolution in which short-cycle fluctuations or higher harmonics were cut off and thus only the fundamental harmonic is shown.

According to this fundamental harmonic, the position P is determined as a minimum point P1 at which the radial force is minimum, and the maximum variation F is determined as the difference between the maximum radial force and the minimum radial force.

Using the maximum variation F in Newtons and the radius TR of the tire in meters, the weight M1 in gram of the patch 10 is determined by the following equation $$M1 = \{(F \times TR)/33^2\} \times 1000 \times a1$$

wherein a1 is a coefficient. The coefficient a1 is set in the range of from 0.5 to 3.0, preferably, in the range of from 0.5 to 1.5.

Comparison Test

A pneumatic tire (size 205/65R15) without the patch was measured for the low-speed fundamental RFV at the circumferential velocity of 7 km/h. Then, changing the position and coefficient a1, the patch was applied to the same tire and the low-speed RFV and high-speed RFV were measured at the circumferential velocity of 7 km/h and 120 km/h, respectively, according to JASO C607-87. The inner pressure and tire load were 200 kPa and 4.9 KN, respectively.

TABLE 1

| Patch | none | | | | |
|---|---|---|---|---|---|
| Position* | — | P | P | C | C |
| Weight M1(g) | 0 | 8 | 17 | 8 | 17 |
| Coefficient a1 | — | 0.5 | 1 | 0.5 | 1 |
| Low-speed fundamental RFV (N) | 57 | 62 | 59 | 61 | 57 |
| High-speed fundamental RFV (N) | 59 | 35 | 29 | 84 | 100 |

*P: Proper position P1, C: Counter position TR = 0.32 m

It was confirmed that the tire properly provided with the patch can be greatly improved in the high-speed fundamental RFV without affecting the low-speed fundamental RFV substantially.

If the coefficient a1 is less than 0.5, it is difficult to reduce the high-speed fundamental RFV. If the coefficient a1 is more than 3.0, it becomes necessary to increase the counter balance weight to be applied to the wheel rim on which the tire is mounted. And there is a possibility of deteriorating the fundamental RFV by contraries.

(B) Determination of Position and Weight Based on Low-speed Fundamental RRO

The radial runout (RRO) of the tire is measured at a relatively slow rotational speed of 60 rpm. The circumferential velocity may be increased up to about 15 km/h as far as the centrifugal force does not affect the measurement.

For the method of measuring the RRO, "Testing method for automobile tire uniformity", Japanese Automobile Standards Organization, C607-87, can be adopted.

Figure 5:
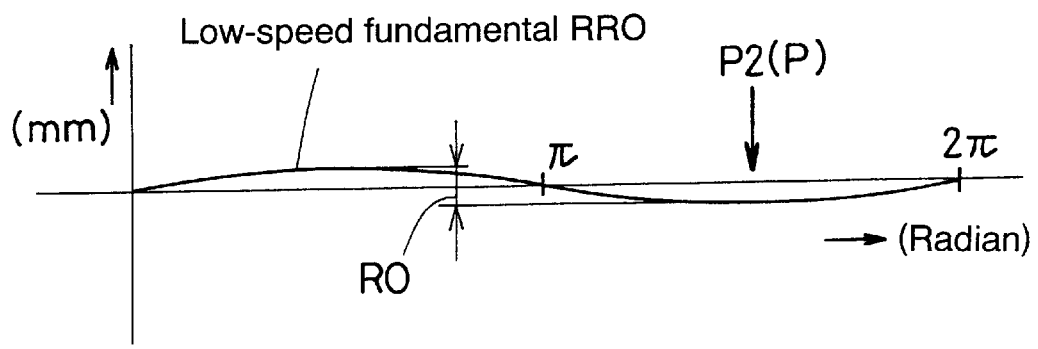
FIG. 5 is a graph showing a low-speed fundamental RRO.

FIG. 5 shows an example of the radial runout per one revolution in which higher harmonics and similar fluctuations were cut off, and thus only the fundamental harmonic is shown.

According to this fundamental harmonic, the position P is determined as a minimum point P2 at which the radial runout is minimum, and the maximum variation RO (mm) is determined as the difference between the maximum radial runout and the minimum radial runout.

Using the maximum variation RO in millimeter and the radius TR of the tire in meter, the weight M2 in gram of the patch 10 is determined by the following equation $$M2=\{(RO \times TR)/33^2\} \times 1000 \times a2$$

wherein a2 is a coefficient. The coefficient a2 is set in the range of from 100 to 400, preferably, in the range of from 100 to 200.

Comparison Test

A pneumatic tire (size 205/65R15) without the patch was measured for the low-speed fundamental RRO at the circumferential velocity of 7 km/h according to JASO C607-87. Then, the position P and weight M2 were determined using the coefficient a2 being 200, and the patch was applied to the tire and the low-speed RFV and high-speed RFV were measured at the circumferential velocity of 7 km/h and 120 km/h in the same manner as above. The inner pressure and tire load were 200 kPa and 4.9 KN, respectively.

TABLE 2

| Patch | none | |
|---|---|---|
| Weight M2(g) | 0 | 22 |
| Coefficient a2 | | 200 |
| Low-speed fundamental RRO (mm) | 0.4 | 0.4 |
| Low-speed fundamental RFV (N) | 51 | 53 |
| High-speed fundamental RFV (N) | 60 | 31 |

TR = 0.32 m

It was confirmed that the tire properly provided with the patch can be greatly improved in the high-speed fundamental RFV without affecting the low-speed fundamental RRO and the low-speed fundamental RFV substantially.

If the coefficient a2 is less than 100, it is difficult to reduce the high-speed fundamental RFV. If the coefficient a2 is more than 400, it becomes necessary to increase the counter balance weight to be applied to the wheel rim on which the tire is mounted. Further, there is a possibility of deteriorating the fundamental RFV.

(C) Determination of Position and Weight Based on Weight Imbalance

Figure 6:
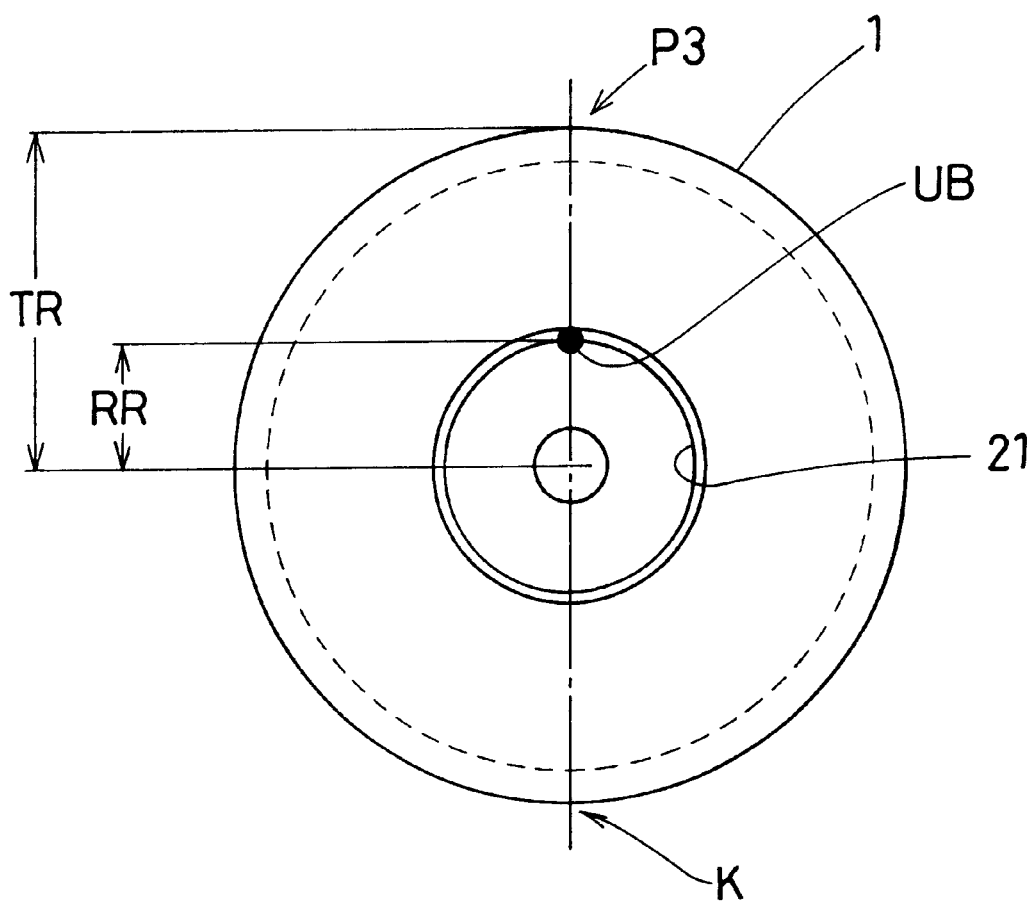
FIG. 6 is a diagram for explaining the static weight imbalance of the tire.

As schematically shown in FIG. 6, the test tire is mounted on a wheel rim 21 having no weight imbalance and supported frictional free to allow the tire and wheel rim assembly to free rotate by the gravity. When the tire is stopped by itself, the uppermost point is defined as the light position P3, and the lowermost point as the heavy position K.

A weight imbalance UB is defined as the value of a weight which can balance with the imbalance of the tire when applied to a particular position on a straight line drawn between the light position P3 and heavy position K. This particular position is spaced apart from the rotational axis towards the light position P3 by a distance RR (m). As the distance RR (m) the radius of the wheel rim or a half of the rim diameter, namely a half of the tire bead diameter is used.

Using the weight imbalance UB in grams, the distance RR in meters and the radius TR of the tire in meters, the weight M3 in grams of the patch 10 is determined by the following equation $$M3=UB \times (RR/TR) \times a3$$

wherein a3 is a coefficient. The coefficient a3 is set in the range of from 0.5 to 2.0, preferably in the range of from 0.5 to 1.5. In this case, the position P is the light position P3. Thus, the patch 10 having the weight M3 is applied to the light position P3.

Comparison Test

On a pneumatic tire (size 275/70R16) not provided with the patch, the light position P3 and the weight imbalance UB was found out, and the weight M3 of the patch 10 was determined thereby. Then, the patch was applied to the tire and the low-speed RFV and high-speed RFV were measured at the circumferential velocity of 7 km/h and 120 km/h according to JASO C607-87. The inner pressure and tire load were 200 kPa and 4.9 KN, respectively.

TABLE 3

| Patch | none | |
|---|---|---|
| Weight M3(g) | 0 | 18 |
| Coefficient a3 | | 1 |
| Weight imbalance UB (g) | 35 | 6 |
| Low-speed fundamental RFV (N) | 63 | 62 |
| High-speed fundamental RFV (N) | 95 | 81 |

RR = 0.2 m, TR = 0.39 m

It was confirmed that the tire provided with the patch can be greatly improved in the high-speed fundamental RFV without affecting the low-speed fundamental RFV.

If the coefficient a3 is less than 0.5, it is difficult to reduce the high-speed fundamental RFV. If the coefficient a3 is more than 2.0, it becomes necessary to increase the counter balance weight to be applied to the wheel rim on which the tire is mounted. Further, there is a possibility of deteriorating the fundamental RFV.

By the above-mentioned tests made relating to the determinations (A), (B) and (C), the following observations are also confirmed. As to (A), the reduction of the high-speed fundamental RFV is effective when the maximum variation F of the low-speed fundamental RFV is more than 50 N, but not effective when F is less than 30 N. As to (B), the reduction of the high-speed fundamental RFV is effective when the maximum variation RO of the low-speed fundamental RRO is more than 1.3 mm, but not effective when RO is less than 0.15 mm. As to (C), the reduction of the high-speed fundamental RFV is effective when the weight imbalance UB is more than 40 g, but not effective when UB is less than 10 g. Further, the reduction is effective if the light position P3 is far from the maximum point of the low-speed fundamental RFV or RRO, but not effective if the light position P3 is near the maximum point.

If the thickness t is more than 2.0 mm, the rigidity difference undesirably increases in the patched portion. If the length L is more than 300 mm, the high-speed fundamental RFV can not be reduced because the centrifugal force acts on a wide range. If the width W is more than the belt width BW, the ground pressure is increased in the tread shoulder portions and as a result uneven wear and heat generation are promoted in these portions.

What is claimed is:

1. A method of improving a high-speed RFV of a pneumatic which comprises:

providing the pneumatic tire comprising a tread portion having a radially inner surface;

providing an elastic patch to be stuck on said radially inner surface of the tread portion;

measuring a low-speed fundamental RFV of the tire to determine a minimum point at which the low-speed fundamental RFV becomes minimum, and to obtain the maximum variation F in Newton between the maximum value and the minimum value of the measured low-speed fundamental RFV;

determining a position of the elastic patch to be stuck as being a circumferential position on said radially inner surface corresponding to said minimum point;

determining a weight in grams of the elastic patch to be stuck as a value obtained by the following equation:

$$\{(F \times TR)/33^2\} \times 1000 \times a1$$

wherein

TR is the radius in meters of the tire and a1 is coefficient in a range of from 0.5 to 3.0;

adjusting the elastic patch to the determined weight; and sticking the weight adjusted elastic patch at said determined position on said radially inner surface of the tread portion.

2. The method according to claim 1, wherein the coefficient a1 is in a range of from 0.5 to 1.5.

3. The method according to claim 1, wherein in measuring the low-speed fundamental RFV of the tire, the rotational speed of the tire is 60 rpm.

4. The method according to claim 2, wherein in measuring the low-speed fundamental RFV of the tire, a rotational speed of the tire is 60 rpm.

5. A method of improving a high-speed RFV of a pneumatic tire, which comprises:

providing the pneumatic tire comprising a tread portion having a radially inner surface;

providing an elastic patch to be stuck on said radially inner surface of the tread portion;

measuring a low-speed fundamental RRO of the tire to determine a minimum point at which the low-speed fundamental RRO becomes minimum, and to obtain the maximum variation RO in millimeters between the maximum value and the minimum value of the measured low-speed fundamental RRO;

determining a position of the elastic patch to be stuck as being a circumferential position on said radially inner surface corresponding to said minimum point;

determining a weight in grams of the elastic patch to be stuck as a value obtained by the following equation:

$$\{(RO \times TR)/33^2\} \times 1000 \times a2$$

wherein

TR is a radius in meters of the tire and a2 is a coefficient in a range of from 100 to 400;

adjusting the elastic patch to the determined weight; and sticking the weight adjusted elastic patch at said determined position on said radially inner surface of the tread portion.

6. The method according to claim 5, wherein the coefficient a2 is in a range of from 100 to 200.

7. The method according to claim 5, wherein in measuring the low-speed fundamental RRO of the tire, a rotational speed of the tire is 60 rpm.

8. The method according to claim 6, wherein in measuring the low-speed fundamental RRO of the tire, a rotational speed of the tire is 60 rpm.

9. A method of improving a high-speed RFV of a pneumatic tire, which comprises:

providing the pneumatic tire comprising a tread portion having a radially inner surface;

providing an elastic patch to be stuck on said radially inner surface of the tread portion;

examining a static weight imbalance of the tire to find a lightweight position of the tire around the tire axis;

determining a value UB in grams of a weight which can statically balance with the weight imbalance of the tire around the tire axis when the weight is applied at a distance equal to RR towards said lightweight position from the tire axis, wherein RR is the radius in meters of a wheel rim for the tire;

determining a position of the elastic patch to be stuck as being a circumferential position on said radially inner surface corresponding to said lightweight position;

determining a weight in grams of the elastic patch to be stuck as a value obtained by the following equation:

$$\{UB \times (RR/TR) \times a3\}$$

wherein

TR is a radius in meters of the tire and $a3$ is a coefficient in a range of from 0.5 to 2.0;

adjusting the elastic patch to the determined weight; and sticking the weight adjusted elastic patch at said determined position on said radially inner surface of the tread portion.

10. A method according to claim 9, wherein the coefficient $a3$ is in a range of from 0.5 to 1.5.

* * * * *